(12) United States Patent
Laurent

(10) Patent No.: US 8,804,868 B2
(45) Date of Patent: Aug. 12, 2014

(54) SYSTEM AND METHOD FOR SENDING AND RECEIVING A DIGITAL SIGNAL OVER A RADIO PATHWAY

(75) Inventor: Pierre-André Laurent, Ville (FR)

(73) Assignee: Thales, Neuilly sur Seine (FR)

( * ) Notice: Subject to any disclaimer, the term of this patent is extended or adjusted under 35 U.S.C. 154(b) by 92 days.

(21) Appl. No.: 13/511,010

(22) PCT Filed: Nov. 18, 2010

(86) PCT No.: PCT/EP2010/067755
§ 371 (c)(1),
(2), (4) Date: Jun. 26, 2012

(87) PCT Pub. No.: WO2011/061255
PCT Pub. Date: May 26, 2011

(65) Prior Publication Data
US 2012/0275537 A1    Nov. 1, 2012

(30) Foreign Application Priority Data

Nov. 20, 2009  (FR) ...................................... 09 05591

(51) Int. Cl.
*H04L 27/18* (2006.01)
(52) U.S. Cl.
USPC .............................. 375/279; 398/188; 455/23
(58) Field of Classification Search
USPC ......................................................... 375/279
See application file for complete search history.

(56) References Cited

U.S. PATENT DOCUMENTS

| 5,881,107 | A * | 3/1999 | Termerinac et al. .......... 375/279 |
| 7,148,820 | B2 * | 12/2006 | Sakai et al. ...................... 341/67 |
| 8,294,591 | B2 * | 10/2012 | Reed et al. ................. 340/855.4 |
| 8,369,451 | B2 * | 2/2013 | Lakkis .......................... 375/308 |
| 8,401,118 | B2 * | 3/2013 | LakkiS .......................... 375/329 |
| 8,428,184 | B2 * | 4/2013 | Golitschek Edler Von Elbwart et al. ............................. 375/308 |
| 2004/0109506 | A1* | 6/2004 | Hinton et al. ................. 375/242 |
| 2005/0286653 | A1* | 12/2005 | Lai et al. ....................... 375/308 |
| 2007/0002986 | A1* | 1/2007 | Green ........................... 375/353 |
| 2011/0317781 | A1* | 12/2011 | Golitschek Edler Von Elbwart et al. ............................. 375/279 |

OTHER PUBLICATIONS

Pierre A. Laurent: "Exact and Approximate Construction of Digital Phase Modulations by Superposition of Amplitude Modulated Pulses (AMP)," IEEE Transactions on Communications, vol. COM-34, No. 2, Feb. 1986, pp. 150-160.

* cited by examiner

*Primary Examiner* — Santiago Garcia
(74) *Attorney, Agent, or Firm* — Baker & Hostetler LLP

(57) ABSTRACT

A constant-amplitude and continuous-phase modulation method for modulating digital data and for demodulating said modulated signal, said data taking the form of symbols a(n) that can take a number M of states at least equal to 2, the method including, in transmission, use of a voltage-controlled oscillator (VCO) for which the control is the sum of pulses he(a(n), t−n T), the form and the amplitude of which depends on the value of a(n); and, in reception, use of a single impulse response filter C0(t) regardless of the value of M in transmission, said functions he and C0 having a number of parameters that are optimized in the design of the system in order to obtain at the output of the filter C0 a constellation that is as close as possible to the theoretical constellation.

8 Claims, 8 Drawing Sheets

Length of impulse response: L T

SYSTEM AND METHOD FOR SENDING AND RECEIVING A DIGITAL SIGNAL OVER A RADIO PATHWAY

CROSS-REFERENCE TO RELATED APPLICATIONS

This application is a National Stage of International patent application PCT/EP2010/067755, filed on Nov. 18, 2010, which claims priority to foreign French patent application No. FR 09 05591, filed on Nov. 20, 2009, the disclosures of each of which are incorporated by reference in their entireties.

FIELD OF THE DISCLOSED SUBJECT MATTER

The invention relates to a method for transmitting and receiving a digital signal over a radio channel, said digital signal comprising information modulated with a constant or quasi-costant-amplitude modulation and the system enabling the implementation thereof.

It is notably used in the field of digital telecommunications over radio channels, when the aim is to increase the efficiency of the transmitter by having it operate partially or totally at saturation.

It applies notably for continuous-phase modulations, or CPM. It is useful in GSM mobile telephony systems that use a GMSK "Gaussian Minimum Shift Keying" modulation.

More generally, it can be used for all the modulations that exhibit a constant or quasi-constant amplitude.

Hereinafter in the description, the Applicant will use the following definitions:
the term "state" of a symbol is used to designate the representation in the complex plane of said symbol.
the term "constellation" of a complex sequence of symbols is used to designate the representation of said symbols in the complex plane.
The term $h_e(a(n), t)$ is the impulse response of a filter whose input is $a(n) \delta(t-n T)$ and is the frequency pulse associated with the symbol $a(n)$.

BACKGROUND

In some current telecommunications systems, the use of costant-amplitude modulations, for example phase or frequency modulations, is preferred, because the latter make it possible to maximize the range of said systems. In practice, the transmission power is constant and at maximum in this case.

In the case of a continuous-phase modulation, there are two known advantages:
A reasonable spectral occupancy, which results in reduced interference between adjacent transmission channels,
A constant amplitude which makes it possible to use the output amplifiers of the transmitters at the maximum of their power, without having to worry too much about their amplitude linearity. This makes it possible to optimize the link budget, with a given average transmission power.

Among these modulations, one of the most widely used, particularly in mobile radio telephony, is GMSK modulation. The latter has been adopted because of its frequency spectrum which exhibits a maximum decrease as a function of the deviation relative to the carrier frequency. It is a binary (and therefore two-state) modulation, and of differential type in that, when two successive bits to be transmitted are different (0/1 or 1/0), the carrier undergoes a total phase rotation of $+\pi/2$ or of $-\pi/2$ otherwise.

The CPM modulations are in practice completely defined by a frequency pulse and by the modulation index h such that the average of the absolute value of the phase rotation is $h \pi$. Most of the time, and for the purposes of simplicity of implementation of the receiver, h is ½.

However, the duration of the frequency pulse associated with a given bit is not limited to the duration of a bit. Thus, for the GMSK modulation mentioned previously, it ought to be infinite since, by definition, the Gaussian curve is of infinite length. In practice, a limit of finite duration (2 or 3 bits) is imposed, such that the performance degradation compared to the theoretical case is negligible.

As long as the system is limited to the binary case, the receiver remains relatively simple.

A theory expounded in the mid 1980s, explained in the publication "Exact and Approximate Construction of Digital Phase Modulations by Superposition of Amplitude Modulated Pulses (AMP)", Pierre. A. Laurent, IEEE Transactions on Communications, Vol. COM-34, No 2, February 1986, pp 150-160, showed that this type of modulation could be approximated by a conventional amplitude and phase modulation and therefore be demodulated by a receiver of low complexity. This is true only in the binary case (1 bit per symbol).

At the current time, the needs in terms of useful bit rate have greatly increased, so much so that there is a desire to generalize the CPM modulations to more than two states: four states make it possible to convey not one bit per symbol but two, eight states 3 bits and 16 states 4 bits.

Unfortunately, even in the case with 4 states, the receiver becomes much more complex than in the case with two states because the inter-symbol interference inherent in this kind of modulation considerably complicates the problem: the signal received for a given symbol depends on its state and on those of its neighbors and the number of configurations becomes so great that there is no simple way to decide on the value of said symbol.

Moreover, the increase in bit rate also entails increasing the modulation speed with the attendant problem of the appearance of problems due to propagation: it may be that, at a given instant, the signal is received in direct sight of the transmitter, but with one or more delayed replicas (reflections on buildings, etc.) that have delays that are not inconsiderable in relation to the duration of a symbol, or even significantly greater. This further increases the complexity of the receiver.

To the knowledge of the Applicant, in the case of a constant or quasi-costant-amplitude modulation, there is no transmission-reception system, of simple design, when the number of states envisaged is greater than 2.

SUMMARY

The invention relates to a constant-amplitude and continuous-phase modulation method for modulating digital data and for demodulating said modulated signal, said data taking the form of symbols that can take a number M of states greater than 2, characterized in that it comprises at least the following steps:
recovering the symbols a(n) of digital data to be transmitted, being presented with a constant time interval T,
associating with each symbol a(n) a frequency pulse denoted $h_e(a(n))$, a frequency pulse of length L T, with L being an integer greater than or equal to 1, and whose form explicitly depends on the value of a(n),
weighting the frequency pulse $h_e(a(n), t)$ by the total phase variation associated with a(n), this total phase variation taking the form $\pi(2a(n)-(M-1))/M$ with $a(n)=0, 1, \ldots, M-1$, and for a symbol of value m, with 0<=m<M have a form corresponding to a combination of 2 K+1 individual pulses:

$$h_e(m, t) = \sum_{i=1}^{K} w_e(m, i)(g(+a_{e,m,i}, \sigma_{e,m,i}, t) + g(m, -a_{e,m,i}, \sigma_{e,m,i}, t)) + \left(1 - 2\sum_{i=1}^{K} w_e(m, i)\right) g(0, \sigma_{e,m,0}, t)$$

in which the function g is a continuous function, of optimized standard deviation $\sigma$ and weighting w(i), $a_e$ is the symbol and a number of its successive derivatives in order to limit the spectral width of the signal sent and a is an integral equal to 1, K the degree of freedom associated with the weight w(i), applying the sum of the successive weighted pulses to the input of a voltage-controlled oscillator (25), in order to generate the signal to be sent, filtering (23), on reception, the signal received, by a single impulse response filter $C_0(t)$ regardless of the number of states of the modulation, the parameters of the frequency pulses $h_e(a(n), t)$ and $C_0(t)$ being adjusted so as to minimize the inter-symbol interference.

The function g(a, $\sigma$, t) is, for example, a standardized Gaussian of average a, a point about which the function is centered, and of standard deviation $\sigma$, and t is a given instant.

The function g(a, $\sigma$, t) is, for example, a standardized Gaussian of average a and of standard deviation $\sigma$ or any other function of adjustable width and position that has enough degrees of continuity.

The filter receiving the impulse response $C_0(t)$ may be constructed as follows:

choosing a reception pulse $h_r(t)$ constructed according to the same method as the pulses $h_e(m, t)$, namely:

$$h_r(t) = \sum_{i=1}^{K} w_r(i)(g(+a_{r,i}, \sigma_{r,i}, t) + g(-a_{r,i}, \sigma_{r,i}, t)) + \left(1 - 2\sum_{i=1}^{K} w_r(i)\right) g(0, \sigma_{r,0}, t)$$

in which the function g is a continuous function, of optimized standard deviation $\sigma$ and weighting w(i), $a_e$ is the symbol and a number of its successive derivatives in order to limit the spectral width of the signal sent and a is an integral equal to 1, K is the degree of freedom associated with the weight w(i), calculating the integral of $h_r(t)$, denoted $f_r(t)$:

$$f_r(t) = \int_{-\infty}^{t} h_r(x) dx$$

then the function $S_0(t)$, given by:

$$S_0(t) = \sin\left(\frac{\pi}{2} f_r(t)\right) \quad 0 \le t \le LT$$

$$S_0(t) = \sin\left(\frac{\pi}{2}(1 - f_r(t - LT))\right) \quad LT \le t \le 2LT$$

and finally the component of the matched filter $C_0(t)$:

$$C_0(t) = \prod_{i=0}^{L-1} S_0(t + iT)$$

The invention relates to a demodulation method implementing the steps of the method explained above in the case where the function g(a, $\sigma$, t) is a standardized Gaussian of average a and of standard deviation $\sigma$ or any other function of adjustable width and position that has enough degrees of continuity.

According to one embodiment, the method may include the insertion of bandpass filters inserted in transmission and/or in reception to limit the bandwidth of the signal transmitted and/or avoid receiving frequency-offset interference. The optimization of the coefficients defining the frequency pulses $h_e(m, t)$ or $h_e(a(n), t)$ and the reception filter $C_0(t)$ is done to minimize the inter-symbol interference by taking into account the influence of the interposed filter(s).

The invention also relates to a system that makes it possible to implement the method according to the invention, said constant-amplitude and continuous-phase modulation system for modulating digital data and for demodulating said modulated signal, said data taking the form of symbols that can take a number M of states greater than 2, characterized in that it comprises at least the following elements:

a transmission module, comprising a bank of filters having a transfer function determined by the implementation of the method explained above, a summer combining said modulated symbols, a voltage-controlled oscillator, a single impulse response filter $C_0(t)$ regardless of the number of states of the modulation, the values of $C_0(t)$ being obtained by executing the steps of the method.

BRIEF DESCRIPTION OF THE DRAWINGS

Other features and advantages of the method and of the system according to the invention will become more apparent on reading the following description of an exemplary embodiment, given as a nonlimiting illustration, with appended figures which represent.

DETAILED DESCRIPTION

In order to better understand the subject of the present invention, the Applicant will describe a transmission-reception system for a digital signal modulated with a constant or quasi-costant-amplitude modulation of CPM type. For this, a review of the principles of CPM modulations will first be given.

Review of Continuous-Phase Modulations (CPM)

Figure 1:
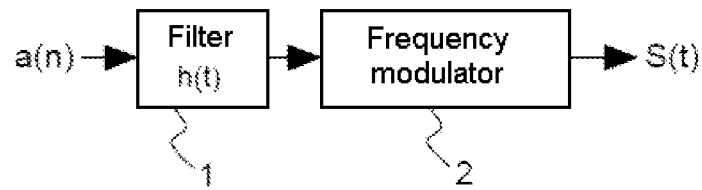
FIG. 1, the production of a signal for continuous-phase modulations.

FIG. 1 represents a continuous-phase modulation scheme. The data to be transmitted take the form of a series or succession of symbols a(n). One or more bits are associated with a symbol to be transmitted. If the symbol a(n) conveys an information bit, its constellation will comprise two states; if it conveys two bits, its constellation will comprise four states, and so on, for a symbol conveying n bits, its constellation will comprise $2^n$ states. The duration of a symbol is T; the inverse of T, expressed in BAUDS, is the modulation speed.

For a series of Dirac pulses spaced apart from one another by a duration equal to T, namely a(n) δ(t−n T): the values of the symbols a(n) define the information to be transmitted via this series of pulses.

For a binary modulation, the symbols a(n) take only the values 0 or 1. The value 0 gives rise to a phase rotation of h π and the value 1 to a phase rotation of −h π.

The constant h is called the modulation index and is more often than not ½.

There is finally a pulse described by a function h(t) defined over a duration equal to L T (L being an integer) and zero otherwise and for which the integral of 0 at L T is 1.

The series of Dirac pulses, after transformation by phase rotations, is convoluted with (filtered by) h(t), 1, and the result drives a frequency modulator 2 (also called VCO, standing for Voltage Controlled Oscillator), which generates a signal centered on the transmission frequency and offset relative thereto by a quantity proportional to its input.

The output signal of the frequency modulator is given by the formula:

$$S(t) = \cos\left(2\pi F_0 t + \sum_{n=-\infty}^{\infty} a(n) \int_{-\infty}^{t} h(x-nT) dx\right) \quad (1)$$

In complex notation, more condensed and more convenient to manipulate, the relationship (1) becomes:

$$S(t) = \prod_{n=-\infty}^{\infty} e^{ja(n)f(t-nT)} \quad (2)$$

in which the function f(t) is the integral of h(t), with the value 0 if t is negative and 1 if t is greater than L T, the symbol Π corresponds to the multiplication.

Figure 2:
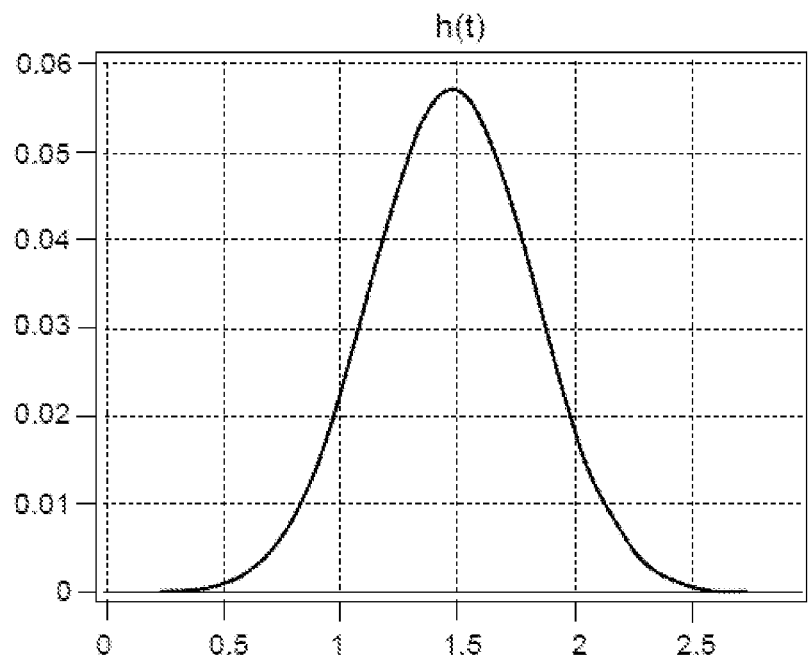
FIG. 2, the representation of the pulse generated by a single bit at the filter output, FIG. 3, an exemplary receiver according to the known prior art, FIG. 4a, an exemplary constellation (values of D(n T) in FIG. 3), for the case with 4 states and, FIG. 4b, an exemplary constellation obtained for the case with 8 states, FIG. 5, an exemplary transmitter architecture according to the invention, FIG. 6a, the frequency pulses $h_e(0)$, $h_e(1)$, $h_e(2)$ and $h_e(3)$ on the transmitter in the case of a 4-state modulation, FIG. 6b, the impulse response of the matched filter in reception, FIG. 6c, the frequency spectrum for a binary modulation, FIG. 6d, the frequency spectrum for a modulation with 4 states and more, FIGS. 7a, 7b, 7c and 7d, the final constellations obtained after demodulation of a signal modulated and demodulated by executing the steps of the method according to the invention, FIG. 8, an exemplary confined frequency spectrum, and FIG. 9, the constellation obtained when the frequency spectrum is confined.

FIG. 2 illustrates an exemplary pulse h(t) and f(t) with L=3, which is a Gaussian of standard deviation 0.35 T.

Coherent demodulation entails knowing the "reference phase" of the carrier, in order to ensure that a signal transmitted with a given phase is indeed seen by the receiver with the same phase. It therefore requires a phase estimation system which often uses a priori known symbols inserted into the modulated signal.

Figure 3:
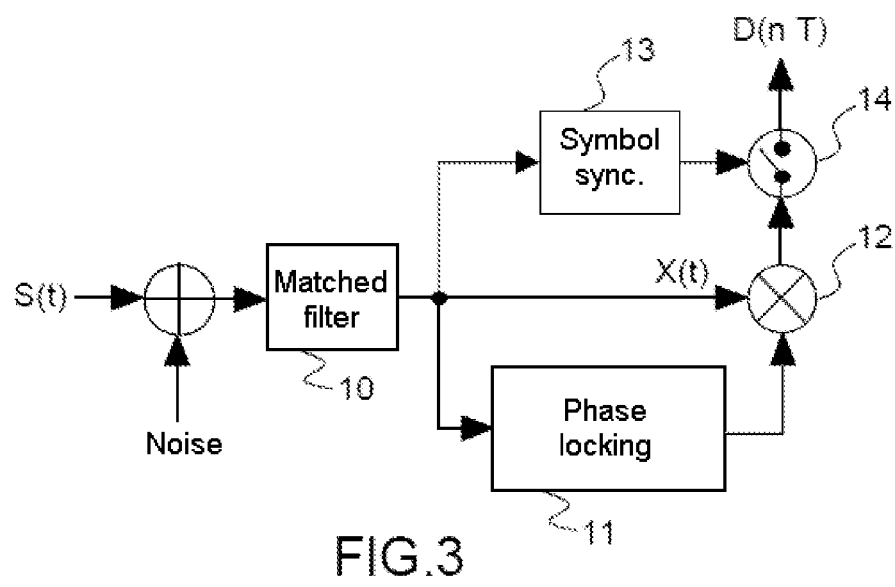

A diagram of a receiver according to the possible prior art is illustrated in FIG. 3.

The signal S(t) received by the demodulator to which is added noise linked to the transmission is filtered by a matched filter 10, that is to say an optimal linear filter making it possible to maximize the signal-to-noise ratio. The result of this operation X(t) is then transmitted to a module 11 which estimates the phase rotation imparted by the transmission channel and the receiver, the output of this module multiplies X(t) using a complex multiplication module 12 by the conjugate of the estimated phase rotation. The signal X(t) is also set at the input of a module 13 which estimates the optimum sampling instant (symbol synchronization). The signal X(t), after phase correction, is then transmitted to a decision-taking module 14 which receives a synchronization signal at the symbol rate 13, which makes it possible to determine the value of the decided symbol D(nT) received at the instant nT.

Figure 4A:
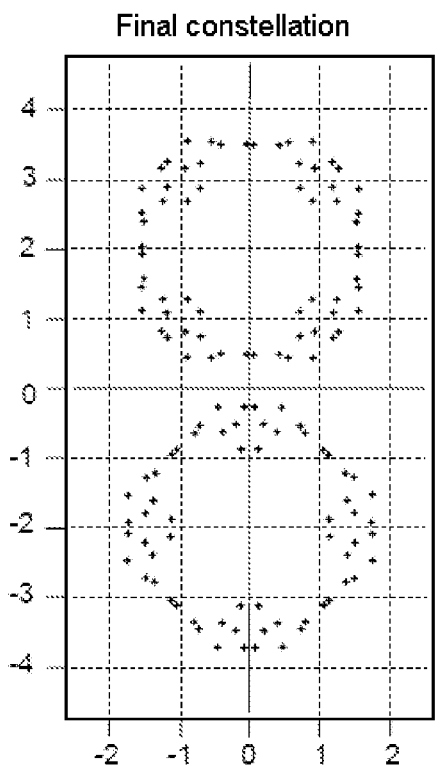
Figure 4B:
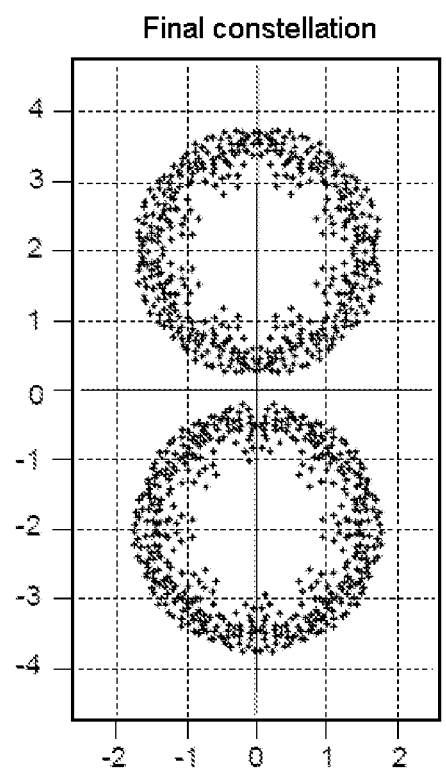

The constellations obtained for the signals D(nT) are represented in FIGS. 4a, 4b. There are, in fact, in this example, two distinct constellations, depending on the parity of the current symbol. This is why FIGS. 4a, 4b show the two constellations separately, respectively in the cases with 4 states and with 8 states.

In theory, in the absence of inter-symbol interference, the constellations should comprise only 2, 4, 8 or 16 points regularly distributed over a circle centered at the origin, the number of points being equal to the number of states.

A simple visual examination of these FIGS. 4a and 4b (obtained in the case where the signal is not noise-affected) shows the point where it may be difficult to decide on the value of the current symbol from 4 (8) possibilities because of the interference that may exist between the symbols. This interference is inevitable when the duration L T of the frequency pulse is greater than T, the duration of a symbol, and amplified by the drag effect of the matched filter 10 in FIG. 3.

Figure 5:
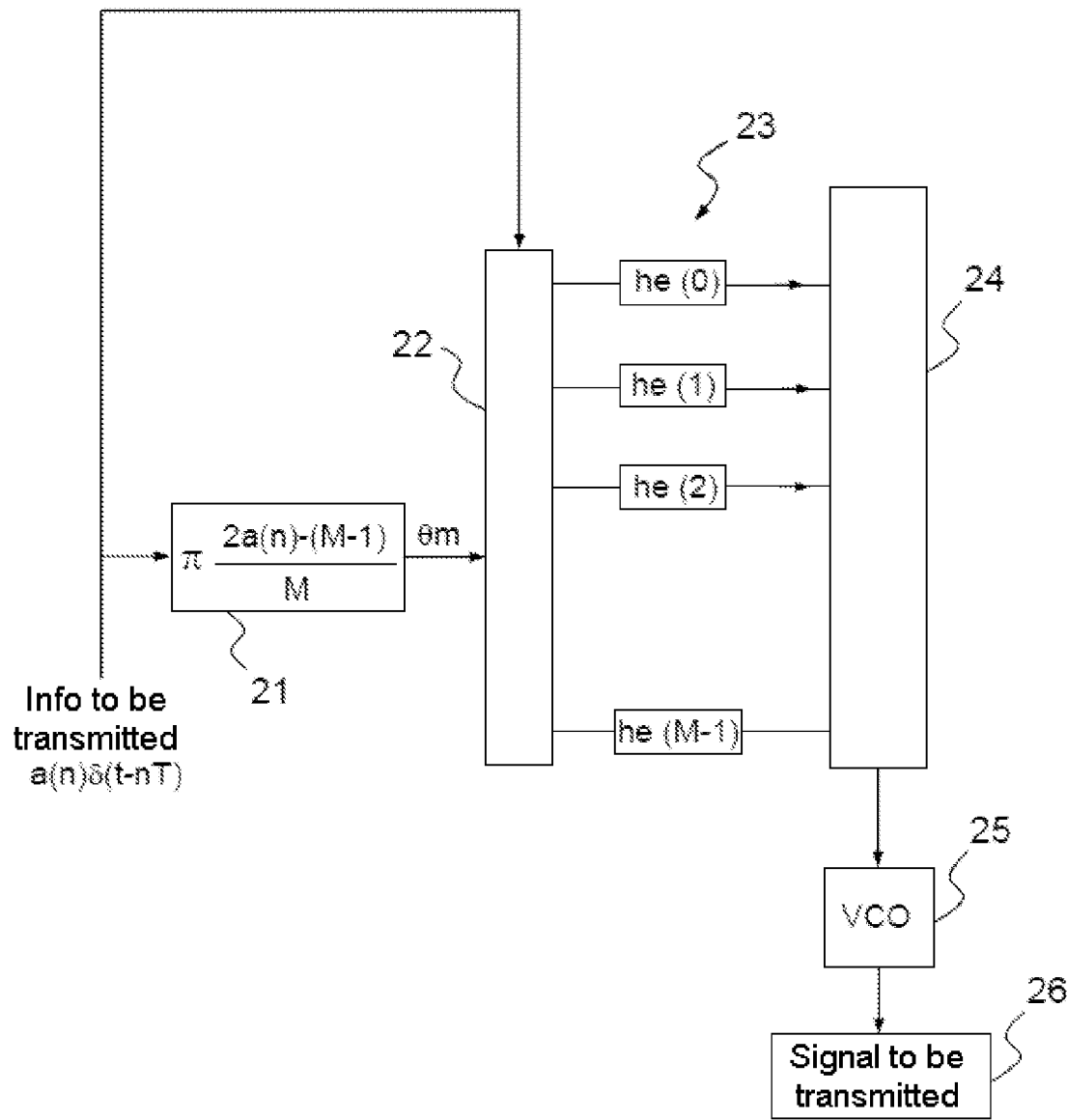

FIG. 5 represents an exemplary architecture for a transmitter according to the invention.

The information to be transmitted, as has been stated, takes the form of a succession of symbols a(n), the value of the symbol to be transmitted here being, by convention, equal to 0, 1, . . . M−1. For example, the information may take the form of a series of Dirac pulses. The series a(n)δ(t-nT) is transmitted, on the one hand, to a phase rotation module 21 producing, at the output, the value θ(n)=π[2 a(n)−(M−1)]/M and, in parallel, to a demultiplexer 22. From this value θ(n) and from the sequence of symbols, the demultiplexer 22 extracts the phases θ(n) constituting a translation of the information to be transmitted. Each of the extracted phases is transmitted to a given filter in a bank of M filters 23 whose transfer function $h_e(m, t)$ has a structure which is detailed later in the description. The function of this bank of filters is notably to modulate the symbols before transmitting them individually to a summer 24 which combines the modulated symbols a'(n) before transmitting them to a voltage-controlled oscillator, or VCO, 25 and to a transmission module 26.

The receiver is identical to the one described in FIG. 3 with the main difference being the fact that the inter-symbol interference present in the signal D(n T) is extremely reduced, which simplifies the receiver which no longer needs to compensate said inter-symbol interference.

Preliminary Observation

In an earlier version of the invention, the "intrinsic" signal/ noise ratio (linked to the residual inter-symbol interference) is of the order of 20 dB. This means that this noise will be present whether the link is good or whether it is bad.

For example, it is the cause of a performance degradation which may be not inconsiderable: if the external noise is 20 dB below the signal; the intrinsic noise (of the same intensity) is added thereto so that the performance levels are as they would be with a signal/noise ratio of 17 dB without intrinsic noise. It is therefore appropriate to substantially reduce this noise, which is the very object of the present invention.

On the Transmitter Side

The idea is to first modify the modulator according to the prior art of the transmitter part which used a function $h_e(t)$ equal to a combination of K+1 Gaussians, given by:

$$h_e(t) = \sum_{i=0}^{K} w(i) h(t - iT)$$

with avec $$\sum_{i=0}^{K} w(i) = 1$$

There were therefore K degrees of freedom for choosing the "weights" w(i) or weighting coefficients of the combined Gaussians.

The guiding idea behind the present invention is to increase the number of degrees of freedom to perfect the optimization.

In order to better illustrate the method and the system according to the invention, the explanation will be given by taking as the basic function a Gaussian denoted $g(a, \sigma, t)$, namely the standardized Gaussian, centered at a and of standard deviation $\sigma$. Without departing from the context of the invention, the function may also be any function of adjustable width and position that has a given number of degrees of continuity.

The function $h_e(t)$ will be replaced by a symmetrical combination of 2K+1 Gaussians of optimized averages, standard deviation $\sigma$ and weighting w(i), and this will be done according to the value m of the symbol to be transmitted (0<=m<M) with M=2, 4, 8, 16 depending on the cases:

$$h_e(m, t) = \sum_{i=1}^{K} w_e(m, i)\left(g(+a_{e,m,i}, \sigma_{e,m,i}, t) + g(-a_{e,m,i}, \sigma_{e,m,i}, t)\right) + \left(1 - 2\sum_{i=1}^{K} w_e(m, i)\right) g(0, \sigma_{e,m,0}, t)$$

The number of degrees of freedom then changes to 3K+1, for each of the M/2 frequency pulses, which allows for more thorough optimization. M/2 because the frequency pulses for a given phase variation are the opposite of those for a contrary phase variation.

If the index m has associated with it a phase variation of $\theta(n)$, generally given by:

$$\theta(m) = \frac{\pi}{M}(2m - (M-1))$$

$$\theta(m) = \frac{\pi}{M}(2m - (M-1))$$

and the support of $h_e(m, t)$ is L T (T=duration of the symbol), the instantaneous frequency at the instant $\tau$ will then be given by:

$$f(nT + \tau) = \sum_{i=0}^{L-1} \theta(m_{n-i}) h_e(m_{n-i}, \tau + iT) \text{ for } 0 \leq \tau \leq T$$

in which $m_n$ is the value of the current symbol to be transmitted at the instant n T.

The different waveform values that are thus obtained will, for example, be stored in a read-only memory to digitally generate the frequency pulses to be transmitted.

The phase variation associated with each symbol a(n) forming the information to be transmitted is filtered via the filter $h_e(a(n), t)$ before being transmitted to a summer, then to the VCO.

On the Receiver Side

In the article cited in the introduction, it is demonstrated that, in the binary case, the CPM signal can be broken down into real phase-modulated individual pulses and that the first of them, denoted $C_0(t)$, conveys most of the energy of the signal. According to the theory of the modulation, if it conveyed all the energy of the signal, it would coincide with the filter matched to the signal, the one that maximizes the signal/noise ratio. Otherwise, it is generally a very good approximation thereof, at least for the Gaussian-based CPMs. It is this approximation which will be chosen to explain the steps of the method making it possible to determine the coefficients of the modulation and demodulation filters.

In the case of a modulation of average index h equal to ½, the method makes the following approximation: a filter matched for a binary signal will also be matched for modulations with 4, 8, 16 states having the same average index.

Consequently, on reception, the matched filter will be calculated for a function $h_r(t)$ given by an equation similar to the one used for the transmission filter:

$$h_r(t) = \sum_{i=1}^{K} w_r(i)(g(+a_{r,i}, \sigma_{r,i}, t) + g(-a_{r,i}, \sigma_{r,i}, t)) + \left(1 - 2\sum_{i=1}^{K} w_r(i)\right) g(0, \sigma_{r,0}, t)$$

With $a_r$ being the point about which is centered the Gaussian g, $\sigma_{r,i}$ is the standard deviation of this Gaussian in reception and t is a given instant.

In the case in point, the method first determines the integral of $h_r(t)$, denoted $f_r(t)$:

$$f_r(t) = \int_{-\infty}^{t} h_r(x)\, dx$$

then the function $S_0(t)$, given by:

$$S_0(t) = \sin\left(\frac{\pi}{2} f_r(t)\right) \qquad 0 \leq t \leq LT$$

$$S_0(t) = \sin\left(\frac{\pi}{2}(1 - f_r(t - LT))\right) \quad LT \leq t \leq 2LT$$

and finally the component of the matched filter $C_0(t)$:

$$C_0(t) = \prod_{i=0}^{L-1} S_0(t + iT)$$

-continued $$C_0(t) = \prod_{i=0}^{L-1} S_0(t+iT)$$

with Π being the mathematical symbol representing the product of the functions $S_0$ over L where LT is the duration of a symbol.

Optimization Procedure and Results

The theoretical calculation of the parameters of the different Gaussians involved in transmission and in reception is almost impossible.

Note that it is done only once, at the system design stage.

Rather, an iterative algorithm is used with constraints whose principle is to maximize the signal/interference ratio at the output of the matched filter.

The algorithm starts with values drawn randomly in the vicinity of "reasonable" values and the parameters are gradually modified by keeping the modifications which improve the result.

The parameters in transmission AND in reception (coefficients a, σ, wi) are simultaneously optimized only for the modulation requiring the highest signal/noise ratio. In the example given, the modulation with 8 states is considered.

For all the other modulations, the filter $C_0(t)$ that is thus obtained is kept and only the transmission parameters are optimized.

Knowing that this type of modulation has a bandwidth greater than that of a conventional GMSK, the constraint will consist in rejecting any set of parameters leading to a "bandwidth" B greater than a maximum value $B_{max}$, dependent on the number of states of the modulation.

If h(f) is the frequency spectrum of the modulation, the criterion will therefore be as follows:

$$B = \sqrt{\int_{-\infty}^{\infty} f^2 |h(f)|^2 df} \leq B_{max}(M)$$

A number of waveforms—that are in fact only very slightly different—according to the system specifications can thus be defined.

The steps which have been explained previously can be executed for any basic function exhibiting enough degrees of continuity, for example by replacing the Gaussian with a modified Bessel function:

$$b(p, m, \sigma, t) = I_0\left(p\sqrt{1 - \frac{(t-m)^2}{\sigma^2}}\right)$$

The rest of the description gives several specific examples of implementation of the method for determining the values of the parameters for the functions whose combination forms a filter.

For the rest of the example of the description, a number K=1 has been taken, meaning that the frequency pulse is the sum of a main Gaussian from which two identical Gaussians are subtracted on either side.

Figure 6A:
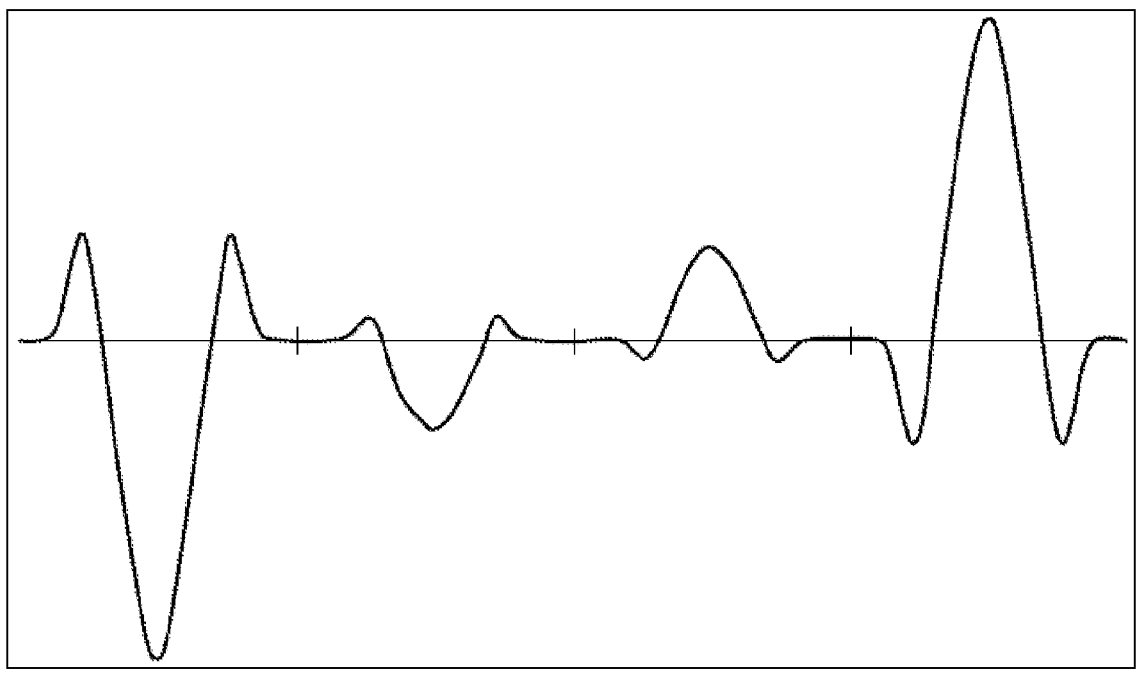
Figure 6B:
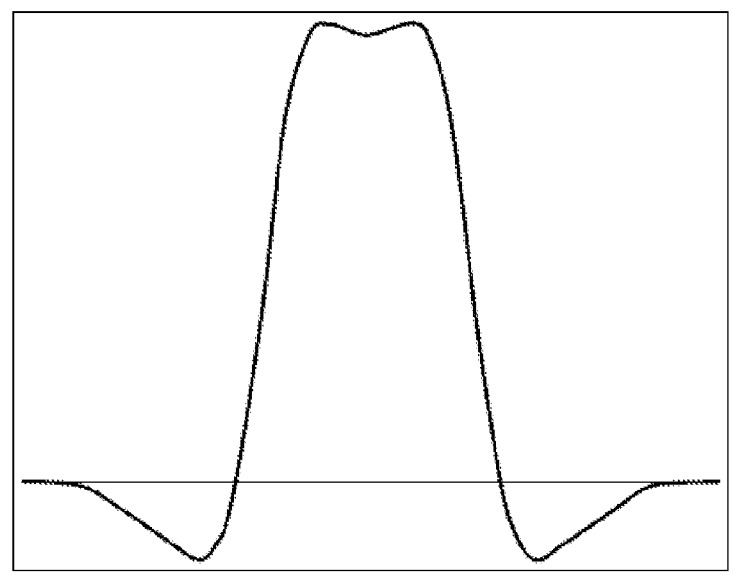

For example, for a maximum out-of-band energy of −35 dB and a minimum S/N ratio of 27 dB, the following results are obtained:

the modulation functions $h_e(m, t)$ (here placed end-to-end for M=4) shown in FIG. 6a;

the impulse response of the matched filter, on the reception side, $C_0(t)$ shown in FIG. 6b;

The "matched filter" has, after optimization, the following parameters:

K=1

Figure 6C:
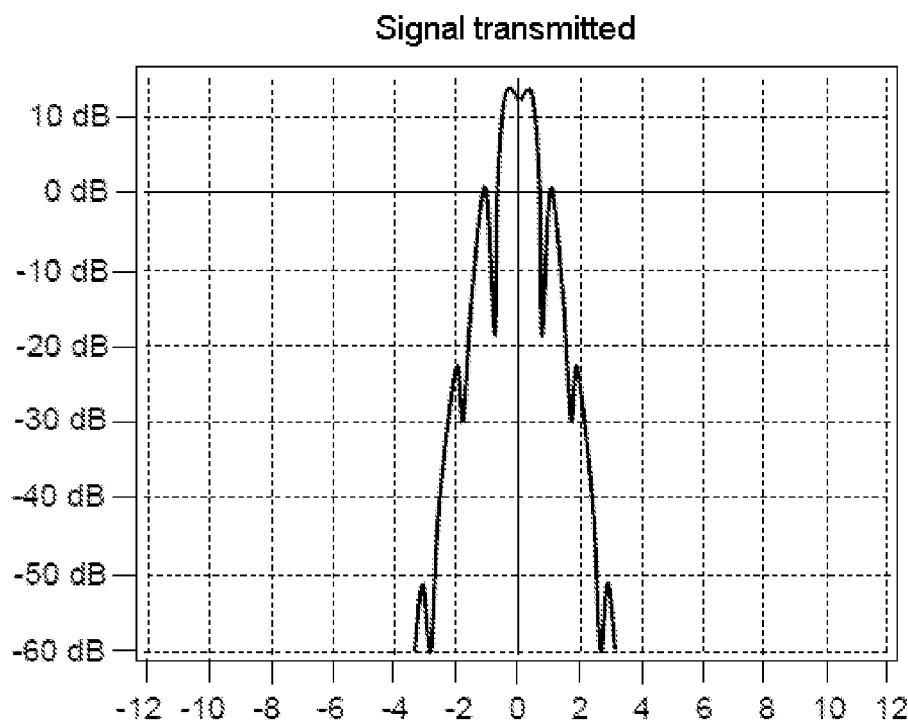
Figure 6D:
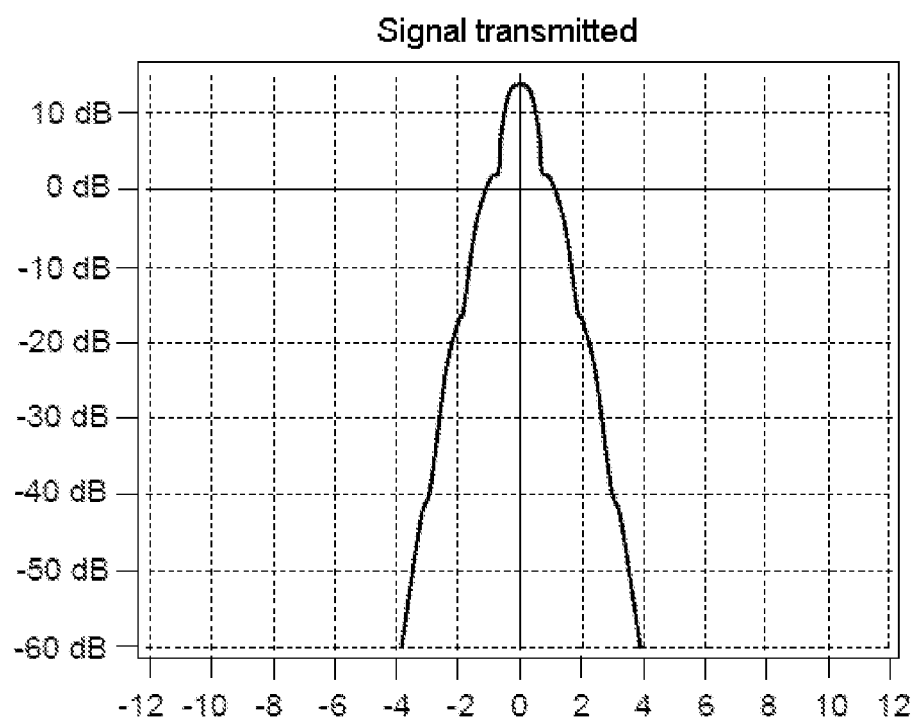
Figure 7A:
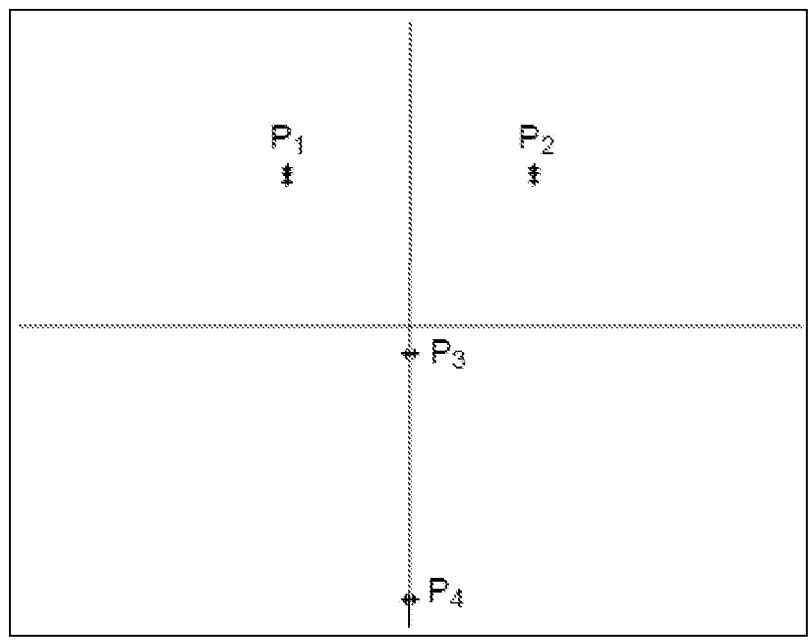
Figure 7B:
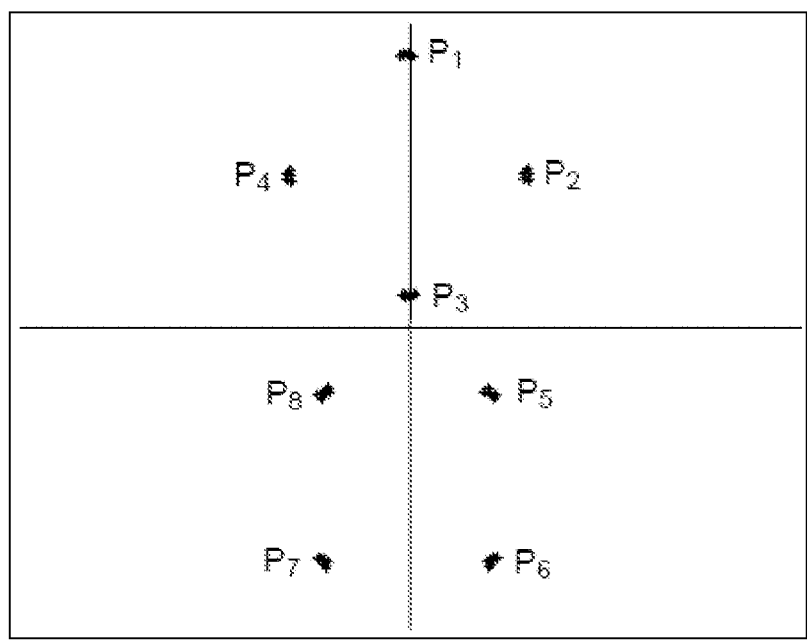
Figure 7C:
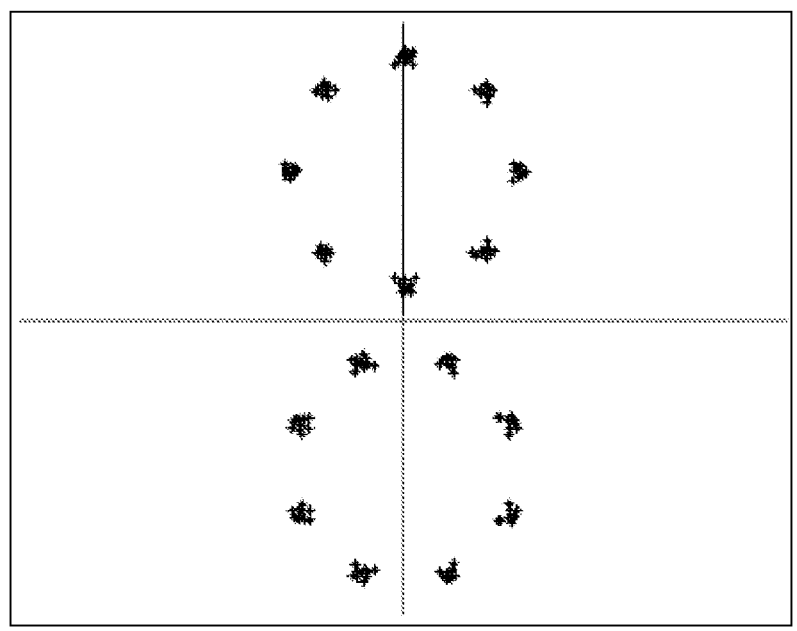
Figure 7D:
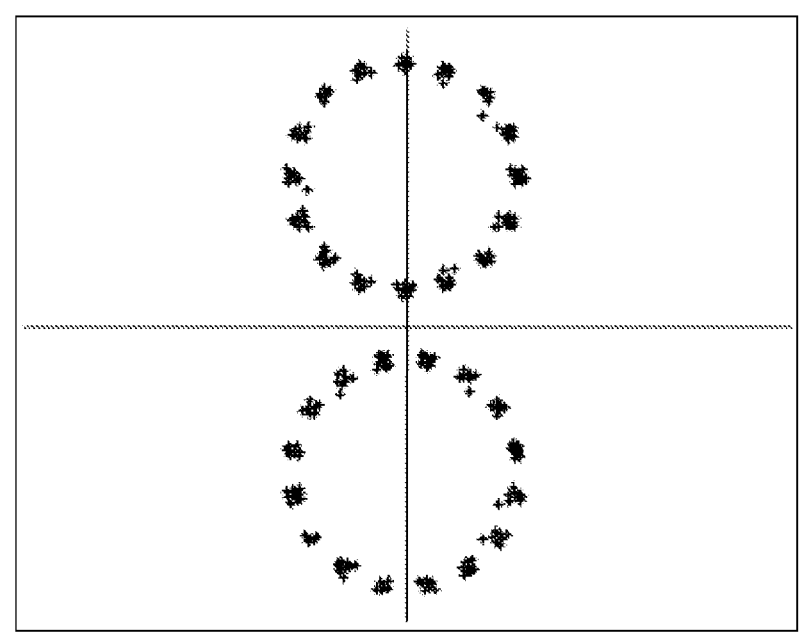

$\sigma_{r, 0} = 0.310$ $w_r(1) = -1.760$ $a_{r, 1} = 0.739$ $\sigma_{r, 1} = 0.142$ the frequency spectrum for a binary modulation (the frequency unit is the modulation speed, in bauds), FIG. 6c;

the frequency spectrum for M=4, 8, 16 states (almost the same in all three cases), FIG. 6d;

and finally the (pairs of) constellations obtained for M=2, 4, 8 and 16 states, FIGS. 7a, 7b, 7c and 7d.

For M=2, parameters after optimization for $h_e(0, t)$, taking into account the fact that $h_e(1, t) = h_e(0, t)$:

K=1

$\sigma_{e, 0, 0}$ 32 0.370

$w_{e, 0}(1) = -6.240$ $a_{e, 0, 1} = 0.723$ $\sigma_{e, 0, 1} = 0.142$

For M=4, parameters after optimization for $h_e(0, t)$ and $h_e(1, t)$, taking into account the fact that $h_e(3, t) = h_e(0, t)$ and $h_e(2, t) = h_e(1, t)$:

K=1

$\sigma_{e, 0, 0} = 0.305 \; \sigma_{e, 1, 0} = 0.321$ $w_{e, 0}(1) = -1.280 \; w_{e, 1}(1) = -0.803$ $a_{e, 0, 1} = 0.796 \; a_{e, 1, 1} = 0.673$ $\sigma_{e, 0, 1} = 0.140 \; \sigma_{e, 1, 1} = 0.137$ For M=8, parameters after optimization for $h_e(0, t)$, $h_e(1, t)$, $h_e(2, t)$ and $h_e(3, t)$ taking into account the fact that $h_e(7, t) = h_e(0, t)$, $h_e(6, t) = h_e(1, t)$, $h_e(5, t) = h_e(2, t)$ and $h_e(4, t) = h_e(3, t)$:

K=1

$\sigma_{e, 0, 0} = 0.309 \; \sigma_{e, 1, 0} = 0.311 \; \sigma_{e, 2, 0} = 0.310 \; \sigma_{e, 3, 0} = 0.310$ $w_{e, 0}(1) = -1.450 \; w_{e, 1}(1) = -1.238 \; w_{e, 2}(1) = -0.7010 \; w_{e, 3}(1) = -0.409$ $a_{e, 0, 1} = 0.803 \; a_{e, 1, 1} = 0.757 \; a_{e, 0, 2} = 0.674 \; a_{e, 1, 3} = 0.720$ $\sigma_{e, 0, 1} = 0.142 \; \sigma_{e, 1, 1} = 0.142 \; \sigma_{e, 0, 2} = 0.142 \; \sigma_{e, 1, 3} = 0.142$ The intrinsic S/N ratio obtained shows an improvement of at least 7 dB compared to the solution proposed in a preceding patent.

M=2 states: SNRi>47 dB

M=4 states: SNRi>33 dB

M=8 states: SNRi>28 dB

M=16 states: SNRi>27 dB

Spectral Characteristics

The frequency spectra shown in the preceding section exhibit a strong and continuous decrease as the distance from the carrier increases, which is characteristic of a modulation based on Gaussian functions of which all the derivatives are continuous in any order. However, the fact that the frequency pulses used exhibit time variations that are more rapid than a single Gaussian means that the frequency spectrum is wider.

It is possible to limit the frequency spectrum to its central portion by filtering the signal just before the modulator. This is reflected in the fact that the amplitude of the signal transmitted is no longer strictly constant and this is reflected by a "peak factor" (ratio between the maximum power to be transmitted and the average power transmitted) changes between 1 and 1.5 dB if the filter is correctly chosen, which is entirely acceptable. The power amplifier has to be "slightly" linear and it is always possible to predistort the modulated signal to almost totally compensate its nonlinearity. By using the same filter in reception, the performance levels are scarcely degraded.

Figure 8:
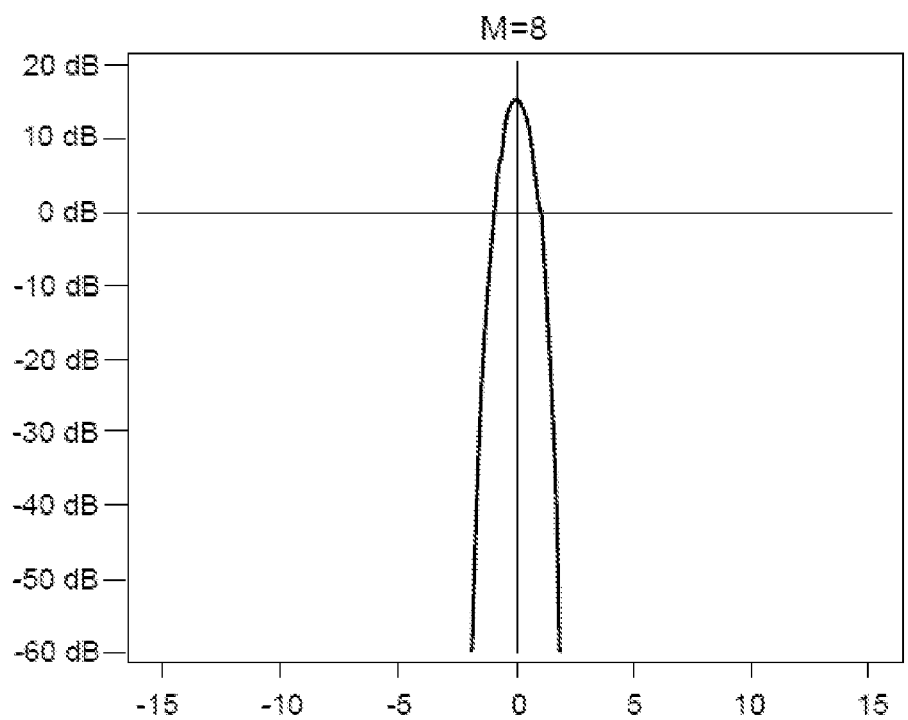

FIG. 8 represents the frequency spectrum after filtering (the peak factor is 1.3 dB) in the case with 8 states. It is possible to check that the pollution of the adjacent channels by a powerful interference will be much lower than previously.

Figure 9:
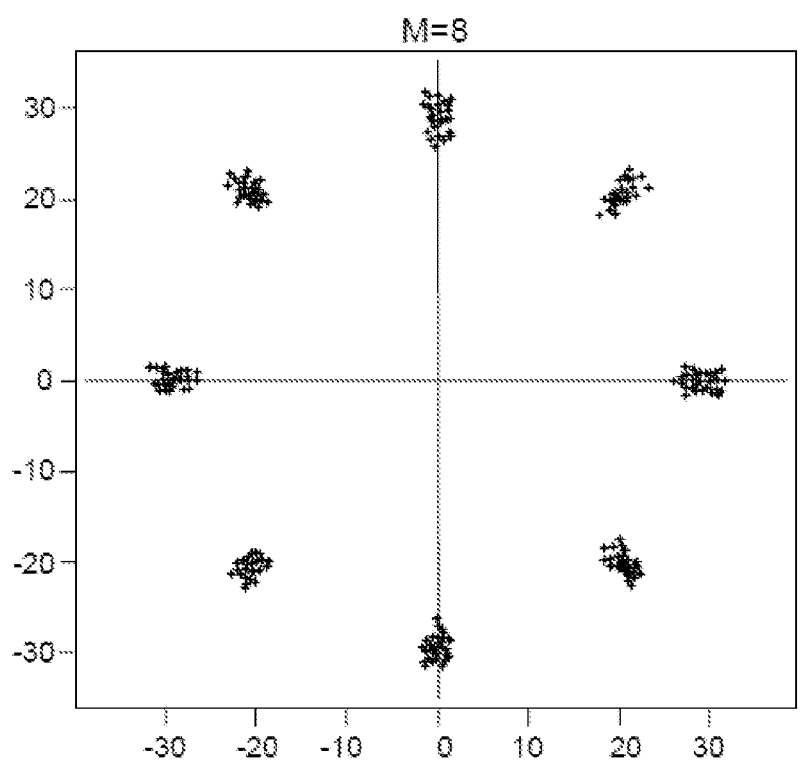

FIG. 9 shows the constellation obtained, still with 8 states: the degradation compared to the case without filtering is insignificant, whereas the transmission and reception parameters are unchanged.

If the filter used in transmission after the modulator and the filter used in reception before the matched filter are well characterized, the optimization of the different coefficients can be redone in order to take account of their presence.

The method according to the invention notably offers the following advantages:

On the Transmission Side

Maximizing the efficiency of the transmission by virtue of a modulation with constant envelope.

Maximizing the transmitted bit rate by virtue of a modulation with more than 2 states.

Not requiring a transmitter with good linearity.

On the Reception Side

Having a receiver that is as simple as possible even for a modulation with more than two states (4, 8 or 16).

Obtaining performance levels very close to theoretical performance levels.

Being able to use the algorithms conventionally implemented for the so-called "linear" modulations, for example an equalizer of any type to fight against propagation issues.

The invention claimed is:

1. A constant-amplitude and continuous-phase modulation method for modulating digital data and for demodulating said modulated digital data, said digital data being in the form of symbols having M number of states, where M is an integer greater than 2, the method comprising:

recovering the symbols a(n) of the digital data to be transmitted, the symbols a(n) of the digital data being recovered periodically at a constant time interval T;

associating, with each symbol a(n), a frequency pulse denoted $h_e(a(n))$ having a frequency pulse of length L T, where L is an integer greater than or equal to 1, and having a form dependent on the value of a(n);

weighting the frequency pulse $h_e(a(n), t)$ by a total phase variation associated with a(n), the total phase variation being in the form $\pi(2a(n) - (M-1))/M$, where a(n) is an integer less than or equal to M−1, and for a symbol of value m, where m is less than M, said function $h_e$ having a form corresponding to a combination of 2 K +1 individual pulses:

$$h_e(m, t) = \sum_{i=1}^{K} w_e(m, i)(g(+a_{e,m,i}, \sigma_{e,m,i}, t) + g(m, -a_{e,m,i}, \sigma_{e,m,i}, t)) + \left(1 - 2\sum_{i=1}^{K} w_e(m, i)\right) g(0, \sigma_{e,m,0}, t)$$

where the function g is a continuous function of standard deviation σ and optimized weighting coefficients, where $w_{e,m,i}$ and $\sigma_{e,m,i}$, $a_{e,m,i}$ are the symbol and a number of successive derivatives of the function g to limit the spectral width of the digital data sent, a is an integral equal to 1, K is the degree of freedom associated with the weight w(i), and t is a given instant;

applying a sum of successive weighted pulses to an input of a voltage-controlled oscillator to generate the modulated digital data to be sent; and filtering, on reception, the received modulated digital data by a single impulse response filter $C_0(t)$ regardless of the number of states of the modulation, wherein the parameters of the frequency pulses $h_e(a(n), t)$ and impulse response filter $C_0(t)$ are optimized to minimize inter-symbol interference of the digital data.

2. The method as claimed in claim 1, wherein the function g(a, σ, t) is a standardized Gaussian of average a, a being a point about which the function g is centered, and of standard deviation σ, where t is a given instant.

3. The method as claimed in claim 1, wherein the function g(a, σ, t) is a function of adjustable width and position having a given number of degrees of continuity.

4. The method as claimed in claim 1, wherein filtering of the received modulated digital data comprises constructing a filter receiving the impulse response $C_0(t)$ by:

choosing a reception pulse $h_r(t)$ constructed according to the same method as the pulses $h_e(m, t)$ according to:

$$h_r(t) = \sum_{i=1}^{K} w_r(i)(g(+a_{r,i}, \sigma_{r,i}, t) + g(-a_{r,i}, \sigma_{r,i}, t)) + \left(1 - 2\sum_{i=1}^{K} w_r(i)\right) g(0, \sigma_{r,0}, t)$$

where the function g is a continuous function of standard deviation σ and optimized weighting coefficients, $w_{r,i}$ and $a_{r,i}$ are the symbol and a number of its successive derivatives to limit the spectral width of the modulated digital data sent, a is an integral equal to 1, K is the degree of freedom associated with the weighting coefficients w(i), and t is a given instant;

calculating an integral of $h_r(t)$, denoted $f_r(t)$, according to:

$$f_r(t) = \int_{-\infty}^{t} h_r(x) dx;$$

determining the function $S_0(t)$, according to:

$$S_0(t) = \sin\left(\frac{\pi}{2} f_r(t)\right) \qquad 0 \leq t \leq LT$$

$$S_0(t) = \sin\left(\frac{\pi}{2}(1 - f_r(t - LT))\right) \quad LT \leq t \leq 2LT$$

; and
determining the filter $C_0(t)$ according to:

$$C_0(t) = \prod_{i=0}^{L-1} S_0(t+iT).$$

5. The method as claimed in claim 4, wherein the function $g(a, \sigma, t)$ is a standardized Gaussian of average $a$ and of standard deviation $\sigma$.

6. The method as claimed in claim 4, wherein the function $g(a, \sigma, t)$ is a function of adjustable width and position of given degrees of continuity.

7. A constant-amplitude and continuous-phase modulation system for modulating digital data and for demodulating said modulated digital data, the system being configured to execute the method according to claim 1, said digital data being in the form of symbols having M number of states, where M is an integer greater than 2, the system comprising:
   a transmission module comprising a bank of filters having a transfer function determined by implementation of the method as claimed in claim 1;
   a summer combining said modulated digital data;
   a voltage-controlled oscillator; and
   a single impulse response filter $C_0(t)$ regardless of the number of states of the modulation, the single impulse response filter $C_0(t)$ being obtained by implementation of the method as claimed in claim 1.

8. The system as claimed in claim 7, further comprising at least one bandpass filter inserted in the transmission module or in the single impulse response filter $C_0(t)$, the at least one bandpass filter being matched to limit the bandwidth of the transmitted digital data or to avoid receiving frequency-offset interference from the modulated digital data.

* * * * *